United States Patent [19]

Patterson

[11] Patent Number: 4,953,581

[45] Date of Patent: Sep. 4, 1990

[54] SELF DRAINING VALVE MEMBER FOR USE IN UNDERGROUND WATER LINES

[76] Inventor: Don Patterson, 4298 Shirley La., Salt Lake City, Utah 84121

[21] Appl. No.: 393,231

[22] Filed: Aug. 14, 1989

[51] Int. Cl.$^5$ .............................................. F16K 15/14
[52] U.S. Cl. ................................ 137/107; 137/512.4; 137/236.1; 239/201
[58] Field of Search ...................... 137/107, 512.4, 60, 137/236, 59; 239/201

[56] References Cited

U.S. PATENT DOCUMENTS

| | | | |
|---|---|---|---|
| 2,646,059 | 7/1953 | Wittner | 137/107 |
| 3,736,951 | 6/1973 | Purtell | 137/107 X |
| 3,762,437 | 10/1973 | King | 239/201 X |
| 3,779,276 | 12/1973 | King | 137/512.4 |

Primary Examiner—Alan Cohan

[57] ABSTRACT

A self draining valve member for use with a water line of an underground water distribution system. The valve member comprises a cylindrical housing having screw threads formed on at least a portion of the outer surface thereof, with the screw threads being adapted to engage a threaded fitting on the water line. The housing has an inner chamber comprising first and second bores extending axially inward from the opposite ends of the housing. The chamber has a transverse wall which divides the chamber into two sub-chambers. A drain bore extends through the transverse wall to establish flow communication between the two sub-chambers. Respective valve heads are positioned in the sub-chambers, with a valve stem extending through the drain bore and connecting the valve heads. A flange projects circumferentially from one end of the housing, and a hollow cylindrical hood extends from the flange away from the housing. Internal screw threads are formed on at least a portion of the internal surface of the hood, and a threaded plug engages the internal threads from the open end of the hood such that one end of the threaded plug can be screwed tightly against the end of the housing. An opening is provided through the threaded plug to establish flow communication between the housing and the cylindrical hood. A porous filter element is sealed between the housing and the threaded plug when the threaded plug is screwed against the second end of the conduit.

11 Claims, 2 Drawing Sheets

SELF DRAINING VALVE MEMBER FOR USE IN UNDERGROUND WATER LINES

BACKGROUND OF THE INVENTION

1. Field of the Invention

The present invention relates to self draining valves which are incorporated in the water lines of underground water distribution systems to automatically drain water from the systems during periods when the water systems are not being used.

2. State of the Art

Underground water distribution systems used in irrigation must be drained during periods of nonuse, especially during periods of freezing conditions. Various means have been used in accomplishing such drainage. Conventional valves can be used to be turned on manually or by an actuator for draining water from the system. To prevent local areas of isolated depressions in the water lines of the system from remaining full of water, air pressure has been used in an attempt to blow all the water from the system.

Automatic, self draining valves have been used in a much improved and more simplified method of draining the water lines. The relatively inexpensive, automatic valves are coupled into the water lines of the system at all low points. When water pressure is turned on in the system, the self draining valves close automatically in response to the water pressure. When water pressure is turned off in the system, the self draining valves automatically open and allow drainage of residual water in the water lines. By draining trapped water from all low spots in the system, damage due to water freezing in the water lines is avoided. Descriptions of representative, automatic, self draining valves is found in the prior patent literature. For example, see U.S. Pat. No. 3,779,276 and other patents noted therein.

3. Objectives

A principal objective of the invention is to provide novel, improved, automatic, self draining valves which can be inexpensively manufactured and assembled.

Another objective of the present invention is to provide such valves which can be readily disassembled by the user in the field for maintenance purposes as contrasted to the valves of the prior art which are sold as a sealed units and cannot have maintenance performed thereon.

An additional objective of the present invention is to provide such valves which have socket adapters which allow a drain tubes to be connected to the valves for disposal of the drain water released by the valves.

A still further objective of the present invention is to provide a resilient valve head unit having a novel insertion stem for installing the valve head unit within the body of the valves.

BRIEF DESCRIPTION OF THE INVENTION

The above objectives are achieved in accordance with the present invention by providing novel improvements in self draining valves of the type having a cylindrical body portion which has external threads on one end thereof which are adapted to engage a threaded fitting of a water line. Such valves further comprise a resilient valve head member located within the body portion for closing and opening in response to water pressure within the water line.

In accordance with the present invention, a cylindrical, hollow hood or socket is provided extending from the other end of the body portion of the valve. The hood or socket has a cylindrical inner surface having internal screw threads formed on at least a portion thereof adjacent to the body portion of the valve. A threaded plug engages the screw threads on the hood or socket, with the plug having an opening therethrough. A porous filter element is sealed between the threaded plug and the body portion of the valve such that the filter element forms a closed end to the body portion of the valve to prevent foreign objects from infiltrating into the body portion of the valve. In addition, the hood or socket can include a smooth section extending from the internal screw threads for making a slip fit with the end of an extension tube to allow controlled disposal of drain water released by the valve.

An additional aspect of the present invention comprises a novel valve head component to be inserted within the valve body portion. The valve head component has first and second valve heads which are interconnected by a relatively short valve stem. An elongate handling stem extends from one of the valve heads and is used in positioning the valve heads properly within the body portion of the valve. A relatively narrow circumferential indentation is provided in the handling stem at a point closely adjacent to the valve head from which the handling stem extends. After positioning the valve heads within the body portion, the handling stem is severed at the circumferential indentation and discarded.

Additional objects and features of the invention will become apparent from the following detailed description, taken together with the accompanying drawings.

THE DRAWINGS

Preferred embodiments of the present invention representing the best mode presently contemplated of carrying out the invention are illustrated in the accompanying drawings in which.

DETAILED DESCRIPTION OF THE ILLUSTRATED EMBODIMENTS

Figure 5:
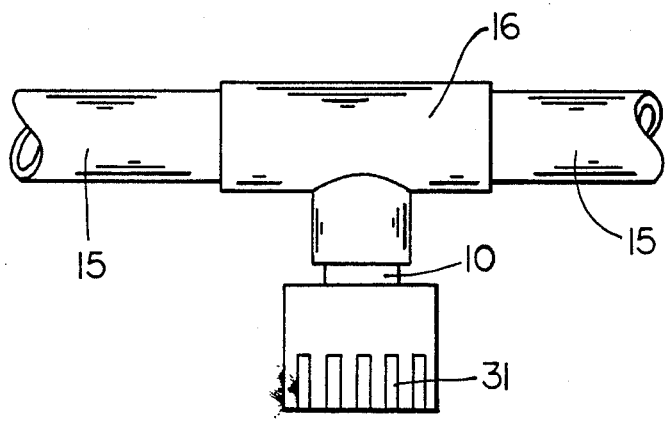
FIG. 5 is a side view of a portion of a water line showing the valve member of the present invention engaging a tee in the water line.

Referring to the drawings, a self draining valve member for use with a water line 15 of an underground water distribution system is shown comprising a first conduit 10 having first and second ends 11 and 12, respectively, and a cylindrical outer surface. Screw threads 13 are formed on at least a portion of the outer surface of the conduit 10 which is adjacent to the first end 11 of the conduit 10. These screw threads 13 are adapted to engage a threaded fitting, such as the tee 16 shown in FIG. 5, on the water line 15 so that the first end of the conduit 10 is in fluid flow communication with the water line 15.

A first bore 17 extends axially inward from the first end 11 of the conduit 10, and a second bore 18 extends axially inward from the second end 12 of the conduit 10. A transverse wall 20 is formed across an intermediate section of the conduit 10 so as to separate the first and second bores 17 and 18. The opposite sides of the transverse wall 20 are substantially flat and form the innermost ends of the first and second bores 17 and 18, respectively.

A drain bore 21 extends through the transverse wall 20 to establish flow communication between the first and second bores 17 and 18, with the drain bore 21 having a reduced passage relative to either of the first and second bores 17 and 18. A first valve seat is formed by the substantially flat, first side of the transverse wall 20 which circumscribes the drain bore 21 at the inner end of the first bore 17, and a second valve seat formed by the substantially flat, second side of the transverse wall 20 circumscribing the drain bore 21 at the inner end of the second bore 18.

A valve head component is positioned in the first and second bores 17 and 18, with the valve head component comprising a first, resilient valve head 23 which is located in the first bore 17. A second resilient valve head 24 is located in the second bore 18, and a valve stem 25 extends through the drain bore 21 and connects the first and second valve heads 23 and 24. The valve stem 25 has a length somewhat greater than the distance along the drain bore 21 between the first and second sides of the transverse wall 20.

The first valve head 23 preferably comprises a substantially circular disc whose diameter is slightly less than the diameter of the first bore 17. The first valve head 23 has a substantially flat face which seats on the first valve seat, which as previously stated is formed by the first side of the transverse wall 20. In a particularly preferred embodiment, a plurality of relatively small protuberances 27 extend from the face of the first valve head 23 at the perimeter thereof. The protuberances 27 act to unseat the first valve head 23 from the first valve seat when there is less than a preset minimum water pressure in the water line 15.

The valve stem 25 is preferably formed integrally with the first valve head 23, with the valve stem 25 extending from the center of the first valve head 23 axially through the drain bore 21 in the transverse wall 20. The second valve head 24 is preferably formed integrally at the other end of the valve stem 25 and comprises an enlargement in the valve stem 25. The valve head 24 has a flat face which is adapted to seat on the second valve seat, which as previously stated is formed by the second side of the transverse wall 20.

The first valve head 23 is adapted to respond to a minimum water pressure in the water line 15 to seat against the first valve seat and thereby inhibit flow of water from the conduit 10 through the drain bore 21. When there is less than the minimum water pressure in the water line 15, the first valve head 23 unseats itself, and water in the water line 15 is allowed to drain through the drain bore 21. The second valve head 24 is capable of seating against the second valve seat in response to pressure of ground water to inhibit backflow of ground water into the water line 15.

The valve member of the present invention, further comprises a flange 30 projecting circumferentially from the second end of the conduit 10, with a hollow cylindrical hood 31 extending from the flange 30 away from the conduit 10. The hood 31 is hollow and preferably forms a socket into which an extension drain tube (not shown in the drawings) can be attached for directing drainage from the drain valve to another location if desired.

Internal screw threads 32 are formed on at least a portion of the internal surface of the hood 31 which is adjacent to the flange 30, and a threaded plug 33 engages the internal threads 32 from the open end of the hood 31 such that one end of the threaded plug 33 can be screwed tightly against the second end of the conduit 10, with the other end of the threaded plug 33 facing away from the conduit 10. An opening 35 is provided through the threaded plug 33 to establish flow communication between the second end of the conduit 10 and the hollow, cylindrical hood 31, and a porous filter element 36 is sealed between the second end of the conduit 10 and the threaded plug 33 when the threaded plug 33 is screwed against the second end of the conduit 10. The threaded plug 33 and the porous filter element 36 form a closed end of the second bore 18 in the conduit 10 to prevent foreign, solid objects such as dirt and pebbles from infiltrating into the second bore 18.

The porous filter element 36 is preferably made of compressed fibrous material as is well known in the art, but could also be made of other porous materials. The conduit 10, transverse wall 20, flange 30 and hood 31 are all preferably molded as an integral unit from a polymeric material such as high impact plastic. The threaded plug 33 is also preferably molded from a polymeric material such as high impact plastic. The valve heads 23 and 24 and the valve stem 25 are preferably molded as an integral unit from a resilient, elastomeric polymer.

As noted previously, it is advantageous to form the hood 31 into a socket which can receive an extension drain tube if desired. In such an embodiment as illustrated in the drawings, the internal screw threads 32 project from the internal surface of the hood 31 in a relatively narrow band which is adjacent to the flange 30, with the internal surface of the hood 31 extending beyond the narrow band of screw threads 32. The extending portion of the internal surface is relatively smooth so that it is capable of making a slip fit with the end of an extensive drain tube.

The threaded plug 33 has an outer diameter which slips snugly along the smooth internal surface of the hood 31 to engage the internal screw threads 32. To aid in the insertion of the threaded plug 33, the end of the threaded plug 33 which faces away from the conduit 10 is provided with diametrically opposed indentations or wells 40 which can be engaged by a spanner tool (not shown in the drawings) to screw the threaded plug 33 into engagement with the internal screw threads 32 of the hood 31.

Figure 1:
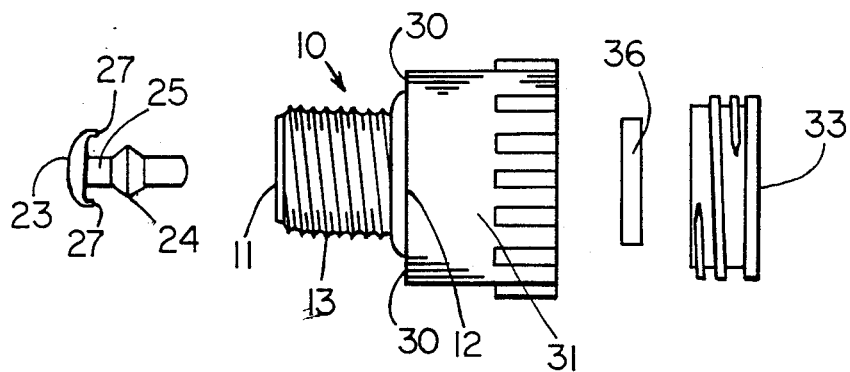
FIG. 1 is an exploded elevation view of a preferred embodiment of a self draining valve member in accordance with the present invention.
Figure 2:
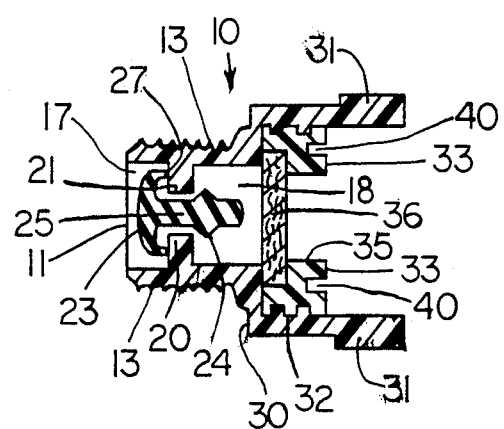
FIG. 2 is an axial cross section through the valve member of FIG. 1 showing the valve member in its completely assembled form.
Figure 3:
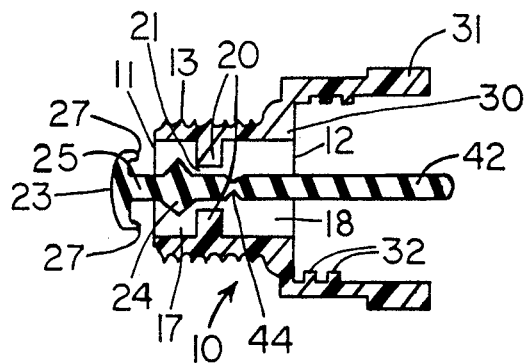
FIG. 3 is a cross section similar to that of FIG. 2 with the plug and filter elements removed and with a valve head component being shown partially inserted into the body portion of the valve member.
Figure 4:
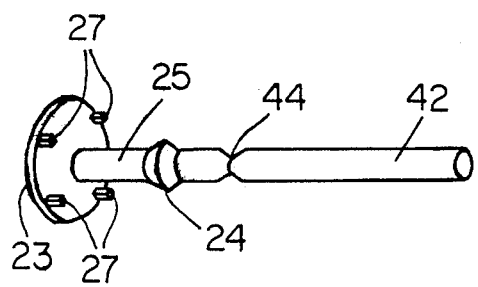
FIG. 4 is a pictorial view of a preferred embodiment of the valve head component of the present invention which has a handling stem extending from one of the valve heads thereof.

As is best shown in FIGS. 3 and 4, the valve head component preferably has an insertion stem 42 integrally attached at one end thereof to the second valve head 24 to extend from the second valve head 24 in a direction substantially opposite to and in substantial alignment with the valve stem 25. The insertion stem 42 has a length substantially greater than the length of the valve stem 25 and a thickness such that it can be slid longitudinally through the drain bore 21. The insertion stem 42 is used to position the valve stem 25 in the drain bore 21 with the first and second valve heads 23 and 24 positioned at opposite ends of the drain bore 21.

The insertion stem 42 is preferably made of a resilient, elastomeric polymer and formed as an integral extension from the second valve head 24. In positioning the valve heads 23 and 24 in the conduit 10, the insertion stem 42 is slid through the drain bore 21 from the first end thereof as shown in FIG. 3. The second valve head 24 has a reduced size in comparison to the first valve head 23, with the second valve head 24 being capable of necking down and being pulled through the drain bore 21 as the insertion stem 42 is pulled by its other end completely through the drain bore 21.

A relatively narrow, circumferential indentation 44 is provided in the insertion stem 42, with the indentation 44 being located closely adjacent to the end of the insertion stem 42 which is attached to the second valve head 24. Upon continued pulling of the insertion stem 42 following pulling of the second valve head 24 through the drain bore 21, the terminal portion of the insertion stem 42 will break free at the circumferential indentation 44 to thereafter be discarded. Preferably, the valve stem 25 and the insertion stem 42 each have a maximum transverse cross-sectional dimension which is no greater than about one half the diameter of the first valve head 23, and the second valve head 24 has a diameter which is no greater than about three fourths the diameter of the first valve head 23.

Although preferred embodiments of the self draining valve member of the present invention have been illustrated and described, it is to be understood that the present disclosure is made by way of example and that various other embodiments are possible without departing from the subject matter coming within the scope of the following claims, which subject matter is regarded as the invention.

I claim:

1. A self draining valve member for use with a water line of an underground water distribution system, said valve member comprising
   a first conduit having first and second ends and a cylindrical outer surface
   screw threads formed on at least a portion of said outer surface which is adjacent to the first end of said conduit, wherein said screw threads are adapted to engage a threaded fitting on the water line such that said first end of said conduit is in fluid flow communication with said water line;
   a first bore extending axially inward from the first end of said conduit;
   a second bore extending axially inward from the second end of said conduit;
   a transverse wall positioned across an intermediate section of the conduit to separate the first and second bores, with opposite first and second sides of said transverse wall being substantially flat and forming the innermost ends of the first and second bores, respectively;
   a drain bore extending through the transverse wall to establish flow communication between said first and second bores, with said drain bore having a reduced passage relative to either of the first and second bores;
   a first valve seat formed by the substantially flat first side of said transverse wall circumscribing said drain bore at the inner end of said first bore;
   a second valve seat formed by the substantially flat, second side of said transverse wall circumscribing said drain bore at the inner end of said second bore;
   a first, resilient valve head in said first bore, said valve head having a face which seats on said first valve seat;
   a second resilient valve head in said second bore to seat on said second valve seat;
   a valve stem extending through said drain bore and connecting said first and second valve heads, wherein said valve stem has a length somewhat greater than the distance along the drain bore between said first and second sides of said transverse wall,
   whereby said first valve head responds to a minimum water pressure in said water line to seat against said first valve seat to inhibit flow of water from said conduit through said drain bore and allows water in said water line to drain through said drain bore when there is less than the minimum water pressure in the water line, with said second valve head being capable of seating against said second valve seat in response to pressure of ground water to inhibit backflow of ground water into the water line,
   with said valve member further comprising
   a flange projecting circumferentially from said second end of said conduit;
   a hollow cylindrical hood extending from said flange away from said conduit;
   internal screw threads formed on at least a portion of the internal surface of said hood which is adjacent to said flange;
   a threaded plug which engages said internal threads from the open end of said hood such that one end of said threaded plug can be screwed tightly against said second end of said conduit, with the other end of said threaded plug facing away from said conduit;
   an opening through said threaded plug which establishes flow communication between said second end of said conduit and said hollow, cylindrical hood; and
   a porous filter element sealed between said second end of said conduit and said threaded plug when said threaded plug is screwed against said second end of said conduit,
   whereby said threaded plug and said porous filter element form a closed end of said second bore in said conduit to prevent foreign, solid objects such as dirt and pebbles from infiltrating into said second bore.

2. A valve member in accordance with claim 1, wherein
   said internal screw threads project from the internal surface of said hood in a relatively narrow band which is adjacent to said flange, with the internal surface of said hood which extends from said narrow band being relatively smooth so that it is capable of making a slip fit with the end of an extension drain tube; and
   said threaded plug has an outer diameter which slips snugly along the smooth internal surface of the hood to engage said internal screw threads.

3. A valve member in accordance with claim 2, wherein the end of said threaded plug which faces away from said conduit is provided with diametrically opposed indentations which can be engaged by a spanner tool to aid in screwing said threaded plug into engagement with said internal screw threads of said hood.

4. A valve member in accordance with claim 1, wherein a plurality of relatively small protuberances extend from the face of said first valve head at the perimeter thereof, said protuberances acting to unseat said first valve head from said first valve seat when there is less than the minimum water pressure in said water line.

5. A valve member in accordance with claim 1, wherein
said first and second valve heads and said valve stem are molded integrally from a resilient elastomeric material.

6. A valve member in accordance with claim 5, wherein
an insertion stem is integrally attached at one end thereof to said second valve head to extend from said second valve head in a direction substantially opposite to and in substantial alignment with said valve stem, said insertion stem having a length substantially greater than the length of said valve stem and a thickness such that it can be slid longitudinally through said drain bore, said insertion stem being used to position said valve stem in said drain bore with said first and second valve heads at opposite ends of said drain bore;
said second valve head has a reduced size in comparison to the first valve head, with the second valve head being capable of necking down and being pulled through said drain bore by said insertion stem as the insertion stem is pulled by its other end completely through said drain bore;
a relatively narrow, circumferential indentation in said insertion stem, said indentation being located closely adjacent to said one end of said insertion stem, such that upon continued pulling of said insertion stem following pulling of said second valve head through said drain bore, the terminal portion of said insertion stem will break free at said circumferential indentation to thereafter be discarded.

7. A valve component to be used in a self-draining valve member, said valve component comprising a first resilient valve head, said first valve head having the general shape of a substantially circular disc;
an elongate valve stem having first and second ends and being integrally attached at its first end to one side of said disc, such that said valve stem extends substantially perpendicular from said one side of said first valve head; a second, resilient valve head having first and second sides, said second valve head being attached at its first side to the second end of said valve stem, said second valve head having a circumferential torus which projects generally radially outwardly from the surface of said valve stem at said second end of said valve stem;
an elongate, resilient handling stem integrally attached at one end thereof to said second valve head to extend from said second valve head in a direction substantially opposite to and in substantial alignment with said valve stem; and
a relatively narrow, circumferential indentation in said handling stem, said indentation being located closely adjacent to said one end of said handling stem.

8. A valve member in accordance with claim 7, wherein a plurality of relatively small protuberances extend from the face of said first valve head at the perimeter thereof.

9. A valve member in accordance with claim 8, wherein said first and second valve heads, said valve stem and said handling stem are molded integrally from a resilient, elastomeric material.

10. A valve member in accordance with claim 7, wherein said first and second valve heads, said valve stem and said handling stem are molded integrally from a resilient, elastomeric material.

11. A valve member in accordance with claim 7, wherein
said valve stem has a maximum transverse cross-sectional dimension which is no greater than about one half the diameter of said first valve head;
said torus of said second valve head has a diameter which is no greater than about three fourths the diameter of said first valve head; and
said handling stem has a thickness substantially no greater than about one half the diameter of said first valve head.

* * * * *